Nov. 6, 1962  YASUHIRO SAWADA  3,062,355
GRANULAR BULK MATERIAL HANDLING APPARATUS
Filed June 15, 1959  5 Sheets-Sheet 1

INVENTOR.

BY Yasuhiro Sawada

Wenderoth, Lind & Ponack
Attys.

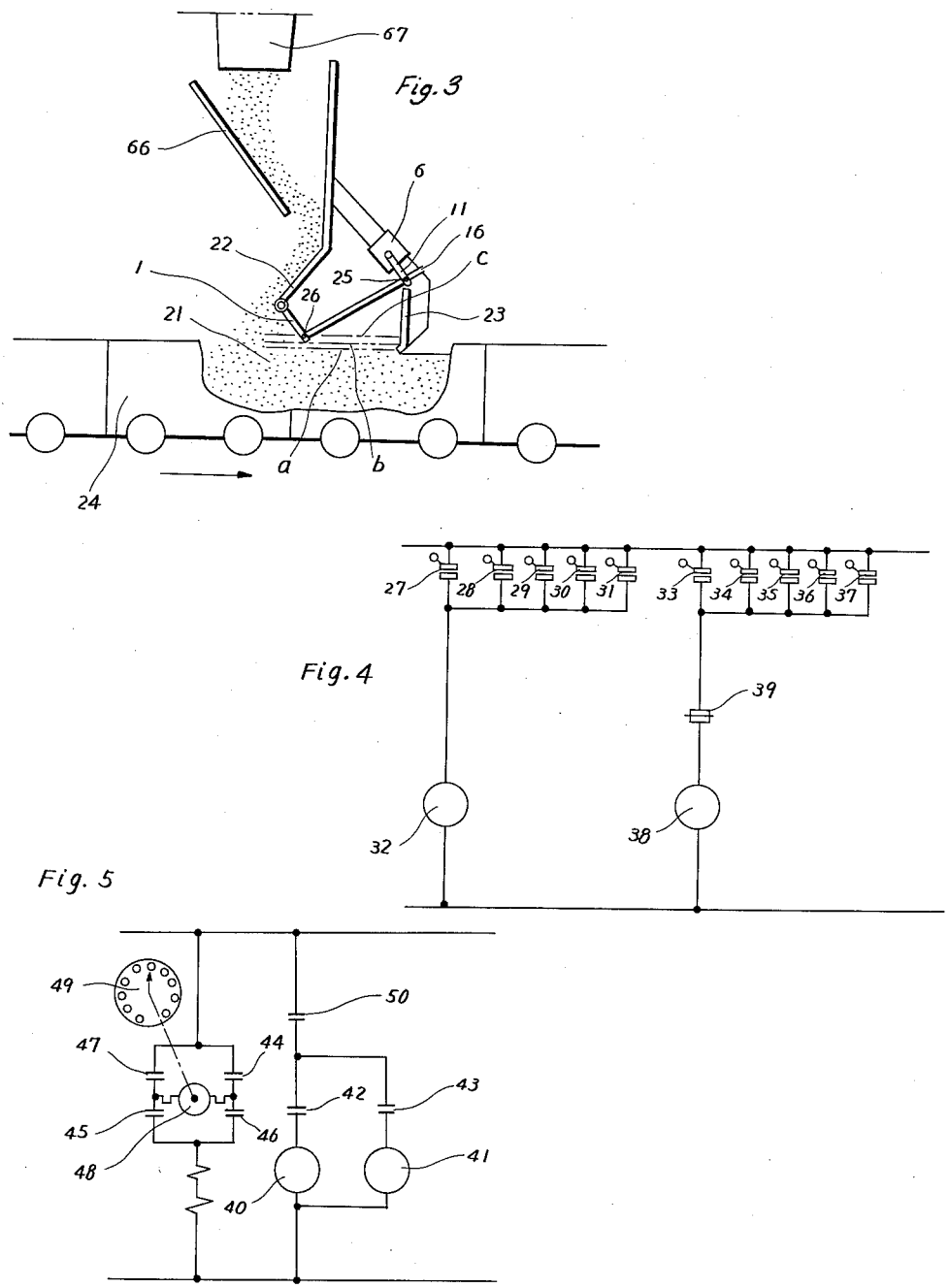

Nov. 6, 1962  YASUHIRO SAWADA  3,062,355
GRANULAR BULK MATERIAL HANDLING APPARATUS
Filed June 15, 1959  5 Sheets-Sheet 5

INVENTOR.

BY Yasuhiro Sawada

Wenderoth, Lind & Ponack
Attys.

United States Patent Office 3,062,355
Patented Nov. 6, 1962

3,062,355
GRANULAR BULK MATERIAL HANDLING APPARATUS
Yasuhiro Sawada, Kokura City, Japan, assignor to Yawata Iron and Steel Co., Ltd., Tokyo, Japan
Filed June 15, 1959, Ser. No. 820,478
Claims priority, application Japan June 18, 1958
1 Claim. (Cl. 198—37)

The present invention relates to an improved method and apparatus for automatically controlling the amount of a granular layer material, and more particularly, of a sinter feed material processed by, for example, the Dwight-Lloyd sinter machine.

In a conventional Dwight-Lloyd sinter machine, the amount of raw material charged thereinto is visually determined, and in accordance with the visual determination thereof, the field rheostat for regulating the sinter machine speed is frequently and manually operated for control in order to maintain the height of feed layer best suited for sintering. However, the amount of feed material to be fed into the sinter machine tends to vary depending on the variation taking place in the feeder and the chute. Accordingly, visual observation and manual control have always resulted in in accurate processing and also many difficulties and troubles. The sinter machine speed should correspond to the amount of sinter feed machine in order to maintain the sinter charge to be constant, the manual control of which is very difficult, requiring manual operation of as many as several hundreds times in the 24-hour work, which results in the severe tension and worry of the operator in charge. In consequence, hallucination happens to him and also the time lag follows.

Inaccurate control results in a non-uniform layer of sinter feed, such as, either too much or too less of material, resulting in also an undesirable condition in the sintering step. All of these undesirable conditions cause the sinter bed layer to be impermeable to air and reduce the permeability so as to delay the descent of the combustion zone considerably, whereby the sinter productivity as well as the sinter quality is exceedingly lowered. At the same time the large amount of dust resulting from the bad sintering step is produced so that the operator is compelled to work in the most dirty environment.

It is known that the sintering process has the following findings:

(1) Input is variable, irregular and indefinite.
(2) Despite the difficulty of detection, the accuracy of detection is required.
(3) No transport lag is allowed for a control agent which controls the above input variables.

Based upon the above findings, I have the four factors in view:

(1) Control medium—the amount of sinter feed material.
(2) Controlling variable—the variable amount of sinter feed material.
(3) Control agent—the sinter machine.
(4) Manipulated variable—the variable speed of the sinter machine.

I have invented an entirely new method for automatically controlling the strand bed depth in order to effect the automatic control in a satisfactory manner.

In accordance with an embodiment of the invention, an improved cutoff gate or plate apparatus which cuts off the top layer of the sinter feed material consists of two independent cutoff gates or plates, one is provided with 5 probe plates which detect the depth of sinter feed material, and the other provided at an angle of 45° to the one with a view to cutting off the top layer slightly and evenly. A small quantity of material remaining after cutting off is subjected to adjustable treatment by means of transport lag taking place at time of the lower limit detection control.

Each of the five probe plates detects the variation of sinter feed depth and transmits its mechanical signal to each of the detectors, respectively. The detectors convert their signals into electrical ones to transmit them to the controller of a driving motor of a field rheostat which adjusts the speed of the sinter machine so as to drive the motor, which in turn operates the field rheostat gradually by means of a timer control in order to finally control the sinter machine speed, the object of which is to maintain an amount of sinter material best suited for operation, and the control is interrupted when this requirement is fulfilled. This method of maintaining the amount of the sinter material to be uniform by controlling the speed of the sinter machine has an advantage that the transport lag is very trifling owing to the almsot simultaneous occurrence of detection, control, and the variation of an amount of sinter material.

Prior to the application of the automatic control of the invention to the sinter machine, it was noted that there were considerable fluctuations of waste gas temperature as well as non-uniformity of sinter quality as shown in FIG. 10 of the accompanying drawings, which will be explained more fully hereinafter, but the fluctuations decreased considerably as shown in FIG. 11 after the installment of the automatic control apparatus of this invention, which clearly shows that a more uniform and better quality of sinter is obtained. As to the speed control of the sintering operation, it was noted that there were a very few chances of control prior to the application of this invention, and sometimes only a manually controlled operation was carried out as shown in FIG. 12, but the permeability as well as the quality of sinter feed material was exceedingly improved so as to increase the rate of production considerably after the employment of the apparatus of the invention. As the control is done automatically, the sintering process is carried out more precisely than ever. Further, the dirty condition is exceedingly reduced so as to provide a much more healthy and sanitary environment for the operators.

This invention will become apparent from the following description when taken in conjunction with the accompanying drawings in which:

FIG. 3 is a view in section of the apparatus of FIG. 1.

FIG. 4 is a diagram of detection control circuit of this invention.

FIG. 5 is a control circuit diagram of a driving motor for use in a field rheostat for controlling the sinter machine speed.

Figure 1:
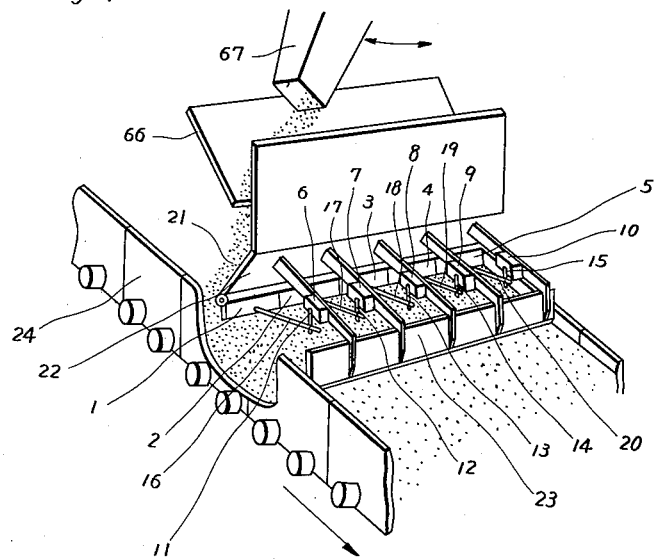
FIG. 1 is a perspective view of a sinter feed charging apparatus embodying features of this invention.
Figure 2:
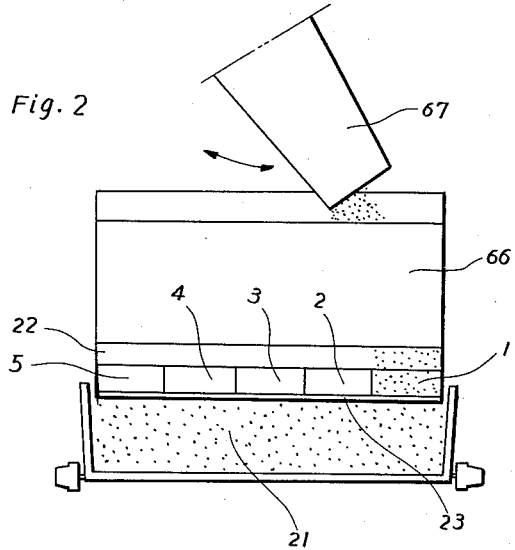
FIG. 2 is a front view of the apparatus of FIG. 1.

Referring to FIGS. 1 and 3, a cutoff plate or gate 22 an another cutoff plate or gate 23 are provided in the sinter material charging apparatus of this invention. The sloping cutoff plate 22, shown in FIGS. 1 and 3, is provided with five probe plates 1, 2, 3, 4 and 5 pivoted at the end thereof. These five probe plates are pivotally linked to the corresponding five detectors, 6, 7, 8, 9 and 10. Arms 11, 12, 13, 14 and 15 are connected at one end to detectors 6–10 respectively to operate the detectors, and are pivoted at the other ends to the ends of rods 16–20 respectively by pins 25. The other ends of rods 16–20 are pivoted to the plates 1–5 respectively at the free ends of the plates. According to the variation of sinter feed material 21, each of the five probe plates 1, 2, 3, 4 and 5 as shown in FIG. 2 ride on the top of the layer of sintering material and thus detect the depth of the layer of sintering material at the foot of respective probe plate, the detection of which is transmitted mechanically to the corresponding detectors 6, 7, 8, 9 and 10 which transmit the action of probe plates through the arms 11, 12, 13, 14 and 15 and the rods 16, 17, 18, 19 and 20 as shown in FIGS. 1 and 3. The detectors 6, 7, 8, 9 and 10 which have received the mechanical signal convert this signal into an electrical signal, which results in the information of whether the material layer depth is at the upper limit at level c, or at the best suited level b or the lower limit level a in the view of FIG. 3.

Figure 6:
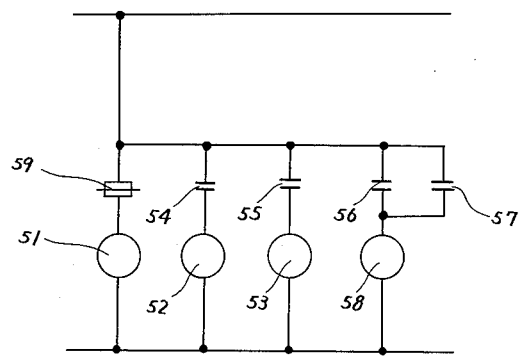
FIG. 6 is a control circuit diagram of a timer of this invention.
Figure 9:
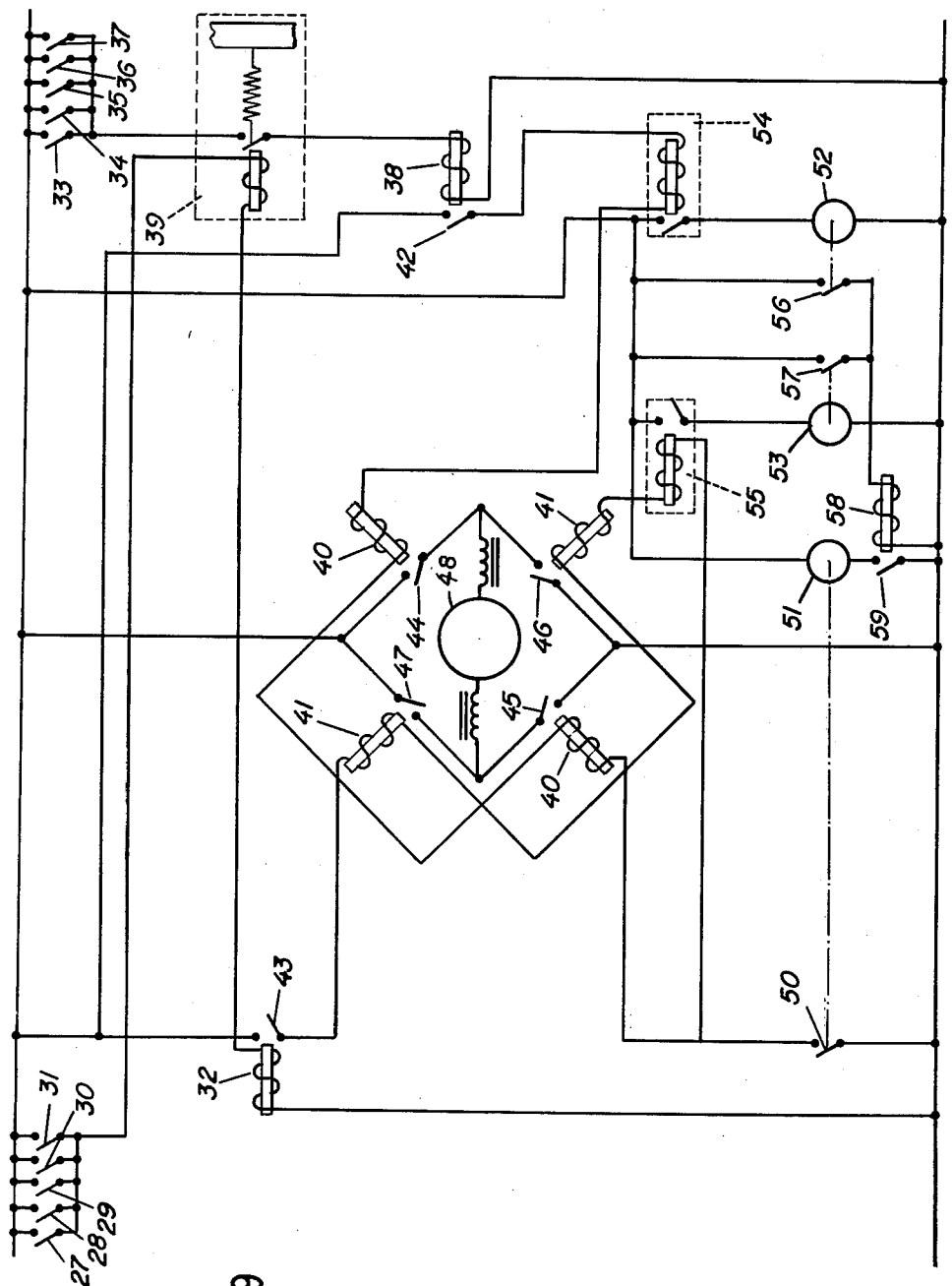
FIG. 9 is a diagram of a control system of this invention.
Figure 10:
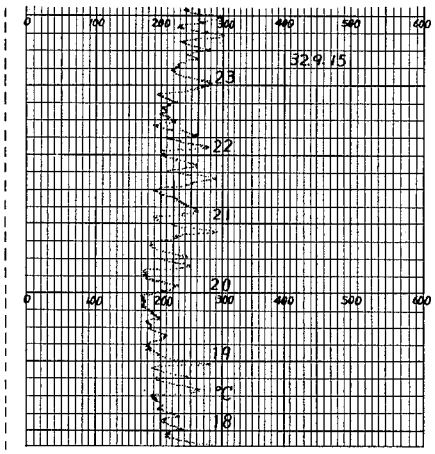
FIG. 10 is a diagram of the temperatures of waste gas prior to the use of this invention.
Figure 12:
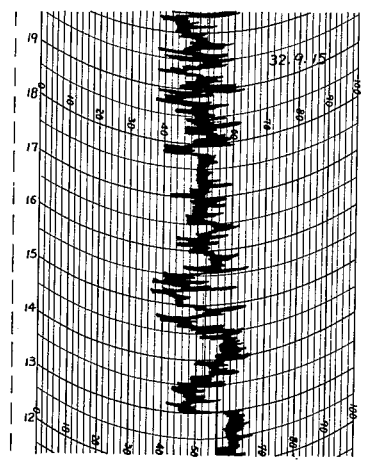
FIG. 12 is a diagram of the speed control of the sinter machine prior to the use of this invention.
Figure 11:
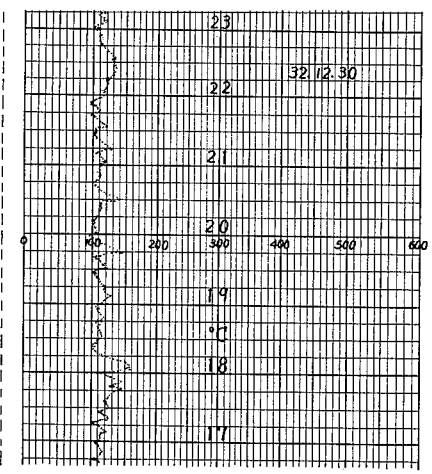
FIG. 11 is a diagram of the temperatures of waste gas after the use of the invention.
Figure 13:
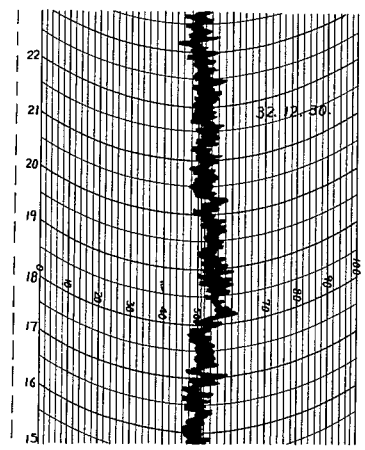
FIG. 13 is a diagram of the speed control of the sinter machine after the use of this invention.

The detection control circuit, parts of which are illustrated in FIGS. 4, 5 and 6, and which is schematically illustrated in FIG. 9 comprises a series of lower limit switch contacts 27–31 and upper limit switch contacts 33–37. There is a limit switch contact for each of the five probe plates 1–5. When the probe plates are at the level a (FIG. 3) the lower limit switch contacts 27–31 will be closed, while when the probe plates reach the upper level c, the upper limit switch contacts will be closed.

Because it is preferable that the apparatus be controlled to avoid the lower level a, i.e. to increase the layer of granular bulk material, should any part of the layer be at the minimum thickness, a cut-out relay 39 is provided in the circuit for the upper limit switch contacts, which relay is energized by the closing of any one of the lower limit switch contacts. Thus, whenever the any one lower limit switch contacts 27–31 are closed, the circuit for the upper limit switch contacts 33–37 will be held open.

In each of the limit switch contact circuits is a rheostat motor control solenoid, the solenoid 32 in the lower limit switch contact circuit serving to energize a control circuit when one or more of the lower limit switch contacts are closed, and the solenoid 38 in the upper limit switch contact circuit being energized when one or more of the upper limit switch contacts is closed. A rheostat driving motor 48 for driving a rheostat 49 is provided, and the field circuits of the rheostat driving motor 48 have rheostat motor actuating switches 44–47 therein. When the switches 46 and 47 are closed, the rheostat driving motor is driven in a direction to compensate for the minimum thickness of the layer of granular bulk material, while the switches 44 and 45 will actuate the rheostat driving motor in the opposite direction. Rheostat motor actuating solenoids 41 are provided for energizing the rheostat motor actuating switches 46 and 47, and these solenoids are connected in a circuit with the actuating switch 42 which is closed by the rheostat motor control solenoid 43. Likewise, rheostat motor actuating solenoids 40 are provided for closing the rheostat motor actuating switches 44 and 45, and these solenoids are connected in a circuit with actuating switch 43 which is controlled by the rheostat motor control relay 38.

Timer means are also provided in the control circuit for the rheostat motor. Timer control relay 55 is provided in the control circuit with the solenoids 41 and actuating switch 43, while control timer relay 54 is provided in the circuit with the solenoids 40 and the actuating switch 42. Control timers 52 and 53 are respectively energized by the relays 54 and 55, and these control timers respectively close rheostat motor control timer energizing switches 56 and 57 after a period of from 0 to 10 seconds. Control timers 52 and 53 can be set to run for a period of time from 0 to 10 seconds. The closing of either of the rheostat motor control timer energizing switches 56 or 57 energizes a rheostat motor control timer solenoid 58 which in turn opens a normally closed rheostat motor cut-off timer actuating switch 59. Switch 59 is included in a circuit with a rheostat motor control timer 51, which may be set for anywhere from 0 to 50 seconds. Control timer 51 controls the opening and closing of rheostat motor cut-out switch 50 which is included in the rheostat driving motor control circuits with the rheostat motor actuating solenoids.

Figure 7:
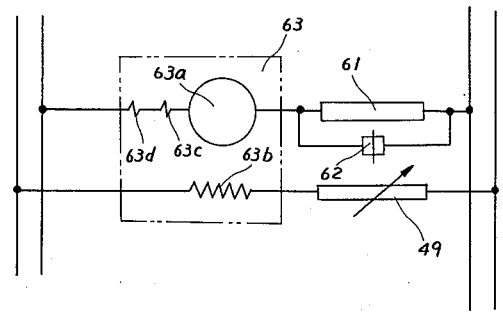
FIG. 7 is a control circuit diagram of a driving motor for the pallet of a sinter machine.

The levels at which the limit switches will close can be adjusted as desired by the adjustment of the series of arms 11, 12, 13, 14 and 15 and the series of rods 16, 17, 18, 19 and 20. In case the desired material depth is that of the end of the cutoff plate 23, it is easily accomplished by adjusting the length of a rod 16, 17, 18, 19 or 20. Similarly, the range of levels is easily adjusted by adjusting the length of an arm 11, 12, 13, 14 or 15. Thus, with the shift of the field rheostat 49 the current of the shunt field of the motor 63 for driving the sinter machine is controlled as shown in FIG. 7 so that the speed of the motor 63 for the sinter machine is either accelerated or decelerated. The control circuit for the motor comprises a series resistance 61 in the armature circuit of the field rheostat 49, an automatic cutoff contact 62 for the series resistance, the motor 63 for driving the sinter machine, an armature 63a, an interpole 63c, a series field 63d, and a shunt field 63b for the motor 63.

In operation, in response to the variation of the sinter material depth or height 21, the series of probe plates 1, 2, 3, 4 and 5 start to transmit their position to the series of detectors 6, 7, 8, 9 and 10 through rods, 16, 17, 18, 19 and 20 and arms 11, 12, 13, 14 and 15 connected therewith, which result in closing one or more of the limit switches 27, 28, 29, 30 and 31 for the lower limit or one or more of the limit switches 33, 34, 35, 36 and 37 for the upper limit in order to excite either the rheostat motor control solenoid 38 for the upper limit or the solenoid 32 for the lower limit. Any type of a probe may be used as desired. When one of the upper limit switch contacts 33, 34, 35, 36 and 37 closes and none of the lower limit switch contacts 27, 28, 29, 30 and 31 closes, the upper limit control solenoid 38 is excited. If only one of the lower limit switch contacts 27, 28, 29, 30 and 31 closes, the lower limit control solenoid 32 is excited immediately. Even though four of the upper limit probe contacts are closed, the upper limit control relay is prevented from being excited by opening of the cut-out switch 39 energized at the same time as solenoid 32 in the circuit of the upper limit solenoid 38. When either the solenoid 38 or 32 is excited, then either the actuating switch 42 for the upper limit or 43 for the lower limit in the control circuit of the rheostat driving motor for controlling the sinter machine speed shown in FIG. 5 is closed to excite either the solenoids 40 or the solenoids 41, the rheostat motor cut-out switch 50 then being closed. If the solenoids 40 are energized, rheostat motor actuating switches 44 and 45 are closed, and the rheostat driving motor is driven in a direction to speed the driving motor 63 for the conveyor 24. This is the clockwise direction in the drawings. If the solenoids 41 are energized, the rheostat driving motor is driven in the opposite direction.

Figure 8:
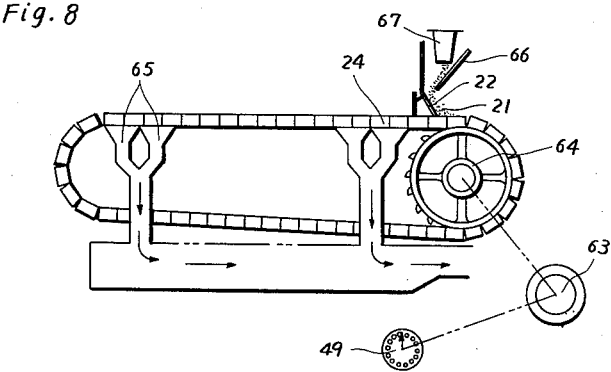
FIG 8 is a layout of the sinter machine embodying features of this invention.

At the same time, one of the control timer relays is closed to commence the operation of one of the control timers 52 or 53. Rotation of the field rheostat motor 48 causes the field rheostat 49 to shift gradually step by step either towards acceleration for the upper limit or towards deceleration for the lower limit by the aid of the timer, which results in either accelerated or decelerated rotation of the motor 63 for driving the pallet 24 of the sinter machine so as to adjust the sinter material depth or height by either an accelerated or decelerated progress of the sinter machine pallet as shown in FIGS. 7–8. FIG. 8 shows a layout of the sinter plant consisting of a field rheostate 49, a sinter machine motor 63, a sprocket 64 for driving the sinter machine, a sinter machine pallet 24, a sloping cutoff plate 22, a back plate 66, a swinging spout 67, and a windbox 65.

Both timers 52 for the upper limit and 53 for the lower limit are adjustable for a period of from 0 to 10 seconds depending upon the variable condition of sinter material. One or the other control timer 52 or 53 closes either the further control timer energizing contact 56 for the upper limit or 57 for the lower limit after a certain period of time so as to excite the solenoid 58 for the cutout timer energizing switch 59, and then the timer 51, which is running, is deenergized and opens rheostat motor contact switch 50 in the control circuit of the rheostat motor so as to deenergize either the rheostat motor actuating solenoid 40 for the upper limit or 41 for the lower limit, which results in stopping the rheostat motor by reason of the opening of the rheostat motor actuating switches 44 and 45 for the upper limit and 46 and 47 for the lower limit. At the same time the field rheostat 49 stops moving, thus completing the speed change of the motor 63 for driving the sinter machine pallet 24, hence the speed control ends for the pallet 24. Simultaneously with deenergizing of either the motor actuating solenoid 40 for the upper limit for driving the rheostat motor or 41 for the lower limit, either the control timer 52 for the upper limit or 53 for the lower limit stops its operation due to the opening of the control timer relay 54 for the upper limit in the timer circuit so as to open the energizing switch 56 for the upper limit or 57 for the lower limit in its relay establishing circuit with the result that the normally closed rheostat motor control timer switch 59 for the timer 51 is again closed due to the deenergizing of the solenoid 58 so that the timer 51 is actuated to close the contact 50 again after a certain period of time in order to excite again the motor actuating solenoids for the rheostat motor. Depending on whether any of the limit switches is closed, the rheostat motor 48 will again be driven to shift the field rheostat, and then the pallet 24 speed is either accelerated or decelerated according to the adjustable speed of the pallet motor 63. If the timer which is adjustable between 0 and 50 seconds is set depending on the variation of sintering material at 0 second, continuous control is being effected while either the upper or the lower limit is detected. This automatic control is either continuously or discontinuously effected until the best suited depth or height of the sinter feed material is obtained by the control system illustrated in FIG. 9; it is suspended when the most suitable depth of sinter material is detected by the five probes, and again put into action when a variation of the material takes place.

I have described hereinabove one embodiment of the invention applied to the Dwight-Lloyd sinter machine, but the invention can be equally applied to other machines in which a granular bulk material is processed, such as cement and refractory material etc.

The apparatus of this invention saves untold money over the investment required with previously used sinter machines as well as considerable savings in manpower, as one man can operate this sinter machine in a continuous fachion, it being noted that once the operation is started it is automatic throughout a sintering cycle until the sinter feed passes the sinter strand.

I claim:

A granular bulk material handling apparatus, comprising a feed means for feeding granular bulk material in an unregulated manner, a treatment conveyor to one end of which said granular bulk material is fed, electric motor means driving said conveyor, a cutoff plate above said conveyor adjacent said feed means for spreading said bulk material in a uniform layer on said conveyor, a plurality of probe plates movably positioned at the feed end of said conveyor between said cutoff plate and said feed means for movement toward and away from the conveyor for detecting the level of the top of the granular bulk material feed against said cutoff plate to the conveyor, and control means actuated by said probe plates for changing the speed of said electric motor driving means for said conveyor depending on the level of the top of the granular bulk material for keeping the thickness of said layer substantially constant, said control means comprising a rheostat for changing the speed of said electric motor means, a rheostat driving motor, actuating means associated with said rheostat driving motor for driving said rheostat driving motor in opposite directions, and limit switch means connected to said actuating means and said probe plates and opened and closed by said probe plates as they move for energizing said actuating means for driving said rheostat driving motor in a direction to drive said rheostat for speeding or slowing said conveyor, a plurality of upper limit switches and a plurality of lower limit switches respectively actuated by said probe plates in the upper and lower limiting position thereof when the level of the top of the layer of granular bulk material is at a maximum or minimum position above said conveyor, and a cut-out switch between said upper limit switches and said rheostat driving motor actuating means and connected in the circuit between said lower limit switches and said rheostat driving motor actuating means for cutting out said upper limit switches when one of said lower limit switches is closed.

References Cited in the file of this patent

UNITED STATES PATENTS

| | | |
|---|---|---|
| 1,259,828 | Bronder | Mar. 19, 1918 |
| 2,367,775 | Hohman | Jan. 23, 1945 |
| 2,702,177 | Jee | Mar. 19, 1918 |
| 2,708,503 | Arnold | May 17, 1955 |
| 2,889,077 | Cunningham | June 2, 1959 |
| 2,920,355 | Clark | Jan. 12, 1960 |